(12) United States Patent
Appavu et al.

(10) Patent No.: US 9,935,775 B2
(45) Date of Patent: Apr. 3, 2018

(54) DETERRING INFORMATION COPYING INCLUDING DETERRENCE OF CURRENCY COUNTERFEITING

(75) Inventors: Rajendran Appavu, Bangalore (IN); Prashant Narayan Kulkarni, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 1341 days.

(21) Appl. No.: 13/272,636

(22) Filed: Oct. 13, 2011

(65) Prior Publication Data

US 2013/0093175 A1   Apr. 18, 2013

(51) Int. Cl.
| | |
|---|---|
| B42D 15/00 | (2006.01) |
| G09C 1/00 | (2006.01) |
| B42D 15/10 | (2006.01) |
| H04L 9/32 | (2006.01) |
| G07D 7/00 | (2016.01) |
| G07D 7/0047 | (2016.01) |

(52) U.S. Cl.
CPC ........... *H04L 9/3247* (2013.01); *G07D 7/003* (2017.05); *G07D 7/0047* (2017.05); *H04L 2209/608* (2013.01)

(58) Field of Classification Search
USPC ........ 283/17, 67, 70, 72, 73, 74, 95, 96, 97, 283/113, 901
See application file for complete search history.

(56) References Cited

U.S. PATENT DOCUMENTS

| | | | |
|---|---|---|---|
| 6,801,999 B1 | 10/2004 | Venkatesan et al. | |
| 7,152,047 B1 | 12/2006 | Nagel | |
| 2002/0067827 A1* | 6/2002 | Kargman | 283/17 |
| 2003/0210805 A1* | 11/2003 | Lofgren et al. | 382/100 |
| 2005/0237576 A1 | 10/2005 | Schneider | |
| 2006/0244251 A1 | 11/2006 | Wei | |
| 2007/0174196 A1 | 7/2007 | Becker et al. | |
| 2009/0121471 A1* | 5/2009 | Gaffney et al. | 283/72 |

FOREIGN PATENT DOCUMENTS

| | | |
|---|---|---|
| CN | 1455912 | 11/2003 |
| CN | 1646327 A | 7/2005 |
| CN | 102164037 | 8/2011 |
| JP | 2005316068 | 11/2005 |

\* cited by examiner

*Primary Examiner* — Justin V. Lewis
(74) *Attorney, Agent, or Firm* — North Shore Patents, P.C.; Michele Liu Baillie

(57) ABSTRACT

A method for deterring information copying, includes: combining a watermark serial number incorporate in a given medium with a content serial number to create a combined serial number, the watermark serial number uniquely identifies the given medium, and the content serial number uniquely identifies a content stored on the given medium; creating a digital signature by encoding the combined serial number using a private key of a public/private key pair; imprinting the content serial number and the digital signature on the given medium; decoding the digital signature imprinted on the given medium using a public key of the public/private key pair to obtain the combined serial number; comparing the decoded combined serial number with the watermark serial number and the content serial number imprinted of the given medium; and in response to determining that both match the combined serial number, determining that the content is authentic.

4 Claims, 6 Drawing Sheets

DETERRING INFORMATION COPYING INCLUDING DETERRENCE OF CURRENCY COUNTERFEITING

BACKGROUND

Currency notes are printed with carefully designed measures to deter counterfeiting. Special paper is used with watermarks and inscribed security threads that have printed information. The information printed for the currency is carefully chosen, often also having miniature printings not easily visible to the naked eye to make reproduction more difficult. Despite these efforts, governments still battle with a significant percentage of counterfeited currency notes.

Currently, governments attempt to deter counterfeiting by limiting the availability of the technologies required to counterfeit the currencies. However, sophisticated organizations have the money and power to purchase the latest counterfeiting technology, including the ability to buy the same paper and the same printer used by the governments to produce the currency notes. As a result, the counterfeit currency matches the authentic currency, such that even banks cannot distinguish them.

The prevention of unauthorized copying of copyrighted information, such as software, movies, music, and other such media content, faces similar challenges, with sophisticated organizations being able to purchase the technology to illegally copy such copyrighted information with precision.

SUMMARY

According to one embodiment of the present invention, a method for deterring information copying, comprises: combining a watermark serial number comprised in a given medium of a plurality of media with a content serial number to create a combined serial number, wherein the watermark serial number uniquely identifies the given medium, wherein the content serial number uniquely identifies a content stored on the given medium; creating a digital signature by encoding the combined serial number using a private key of a public/private key pair; and imprinting the content serial number and the digital signature on the given medium.

In one aspect of the present invention, the method further comprises: decoding the digital signature imprinted on the given medium using a public key of the public/private key pair to obtain the combined serial number; comparing the decoded combined serial number with the watermark serial number comprised in the given medium and the content serial number imprinted on the given medium; and in response to determining that the watermark serial number comprised in the given medium and the content serial number imprinted on the given medium match the combined serial number, determining that the content is authentic.

In another aspect of the present invention, the method further comprises: in response to determining that the watermark serial number comprised in the given medium, or the content serial number imprinted on the given medium, fails to match the decoded combined serial number, determining that the content is counterfeit.

In another aspect of the present invention, the given medium comprises a given piece of financial instrument paper of a plurality of financial instrument papers, and the content comprises printed matter printed on the given piece of financial instrument paper, wherein the method comprises: combining a watermark serial number comprised in the given piece of financial instrument paper with a printed matter serial number to create the combined serial number, wherein the watermark serial number comprised in the given piece of financial instrument paper uniquely identifies the given piece of financial instrument paper, wherein the printed matter serial number uniquely identifies the printed matter; creating the digital signature by encoding the combined serial number using the private key of the public/private key pair; and printing the printed matter serial number and the digital signature on the given piece of financial instrument paper to create a financial instrument.

In another aspect of the present invention, wherein the printing the printed matter serial number and the digital signature on the given piece of financial instrument paper, comprises: converting the digital signature to a bar code; and printing the printed matter serial number and the bar code on the given piece of financial instrument paper to create the financial instrument.

In another aspect of the present invention, the method further comprises: decoding the digital signature printed on the given piece of financial instrument paper using a public key of the public/private key pair to obtain the combined serial number; comparing the decoded combined serial number with the watermark serial number comprised in the given piece of financial instrument paper and the printed matter serial number printed on the given piece of financial instrument paper; in response to determining that the watermark serial number comprised in the given piece of financial instrument paper and the printed matter serial number printed on the given piece of financial instrument paper match the combined serial number, determining that the financial instrument is authentic.

In another aspect of the present invention, wherein the given medium comprises a given digital content storage of a plurality of digital content storages, wherein the content comprises digital content stored on the given digital content storage, wherein the method comprises: combining a watermark serial number comprised in the given digital content storage with a digital content serial number to create the combined serial number, wherein the watermark serial number uniquely identifies the given digital content storage, wherein the digital content serial number uniquely identifies the digital content; creating the digital signature by encoding the combined serial number using the private key of the public/private key pair; and imprinting the digital content serial number and the digital signature on the given digital content storage.

In another aspect of the present invention, the method further comprises: decoding the digital signature imprinting on the given digital content storage using a public key of the public/private key pair to obtain the combined serial number; comparing the decoded combined serial number with the watermark serial number comprised in the given digital content storage and the digital content serial number imprinted on the given digital content storage; in response to determining that the watermark serial number comprised in the given digital content storage and the digital content serial number imprinted on the given digital content storage match the combined serial number, determining that the digital content stored on the given digital content storage is an authentic copy.

System and computer program products corresponding to the above-summarized methods are also described and claimed herein.

DETAILED DESCRIPTION

Figure 1:
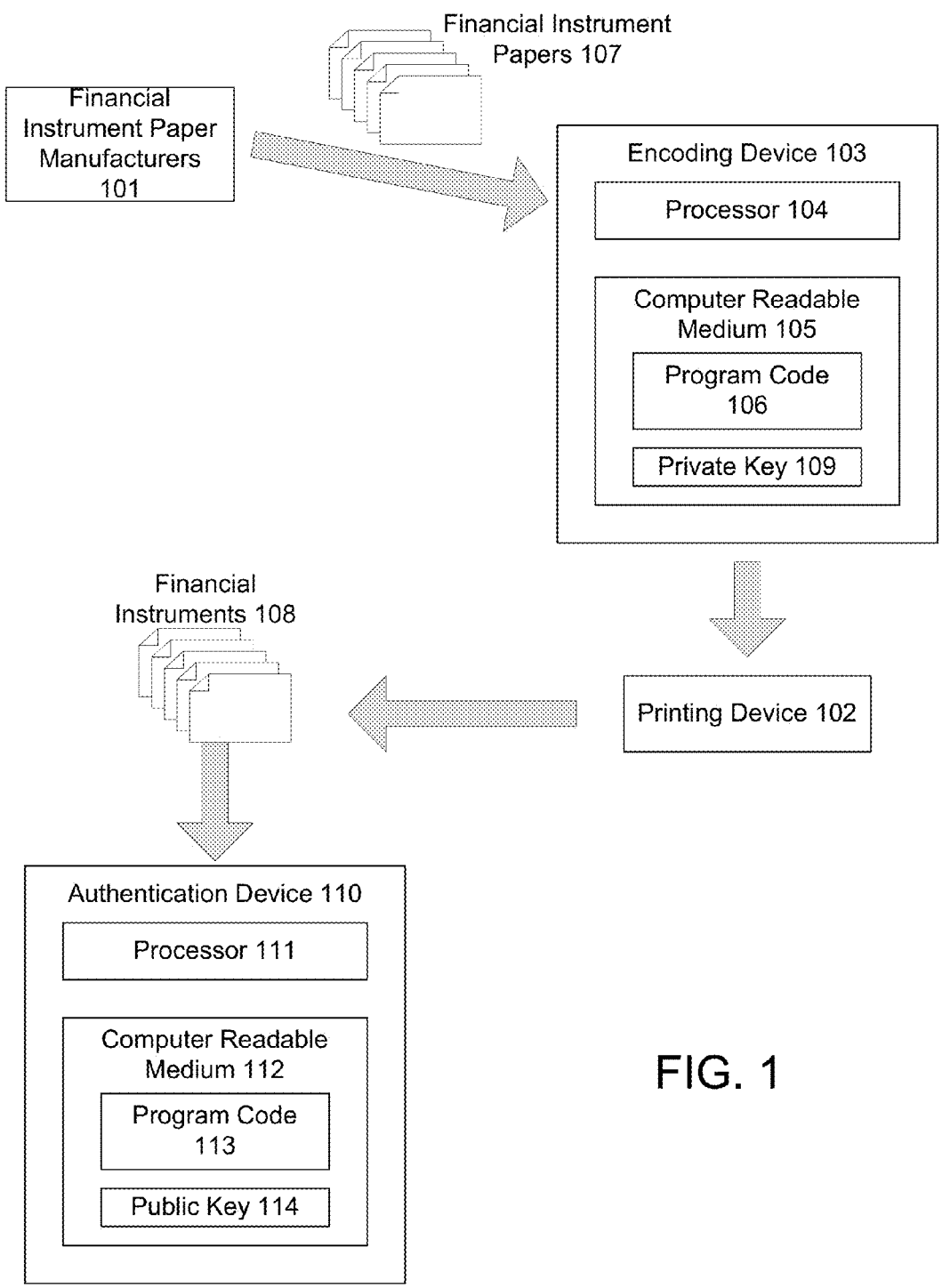
FIG. 1 illustrates an embodiment of a system for deterring information copying according to the present invention.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java® (Java, and all Java-based trademarks and logos are trademarks of Sun Microsystems, Inc. in the United States, other countries, or both), Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer special purpose computer or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified local function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

FIG. 1 illustrates an embodiment of a system for deterring information copying according to the present invention. In this embodiment, the system deters the counterfeiting of printed financial instruments. The system comprises financial instrument paper manufacturers 101, a printing device 102, an encoding device 103, and an authentication device 110. The financial instrument paper manufacturers 101 supply a plurality of financial instrument papers 107. Each financial instrument paper is used to produce one financial instrument. In this embodiment, each financial instrument paper is manufactured to comprise a unique serial number incorporated within the paper as a watermark. The printing device 102 prints the financial instruments 108 using the financial instrument papers according to the various embodiments of the present invention. The encoding device 103 is operationally coupled to a processor 104 and a computer readable medium 105. The computer readable medium 105 stores computer readable program code 106 and a private key 109 of a public/private key pair for implementing an encoding method of the present invention. The authentication device 110 is operationally coupled to a processor 111 and a computer readable medium 112. The computer readable medium 112 stores computer readable program code 113 and a public key 114 of the public/private key pair for implementing a decoding method of the present invention.

Figure 2:
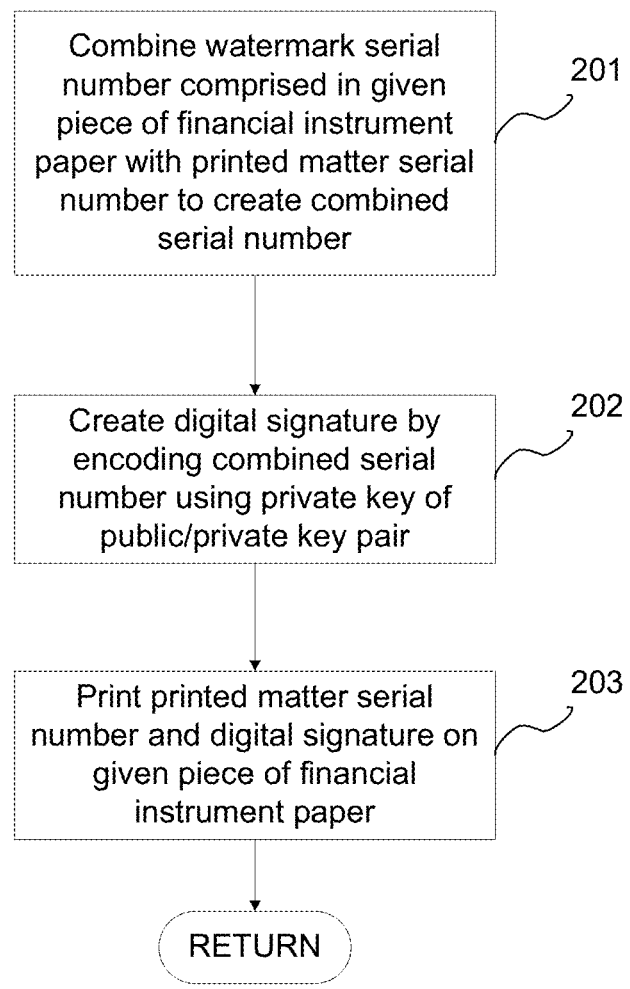
FIG. 2 is a flowchart illustrating an embodiment for encoding authentication information in a method for deterring information copying according to the present invention.

FIG. 2 is a flowchart illustrating an embodiment for encoding authentication information in a method for deterring information copying according to the present invention. For each financial instrument 108 to be printed, a given piece of financial instrument paper 107 is used. The given financial instrument paper 107 comprises a unique watermark serial number incorporated within the paper, which uniquely identifies the given financial instrument paper 107. The financial instrument 108 is also assigned a printed matter serial number that is to be printed onto the given piece of financial instrument paper 107, which uniquely identifies the financial instrument 108. The encoding device 103 combines the watermark serial number of the given piece of financial instrument paper 107 and the printed matter serial number to create a combined serial number (201). The encoding device 103 creates a digital signature by encoding the combined serial number using the private key 109 of the public/private key pair (202). The printed matter serial number and the digital signature are printed on the given piece of financial instrument paper 107 by the printing device 102 (203).

Figure 3:
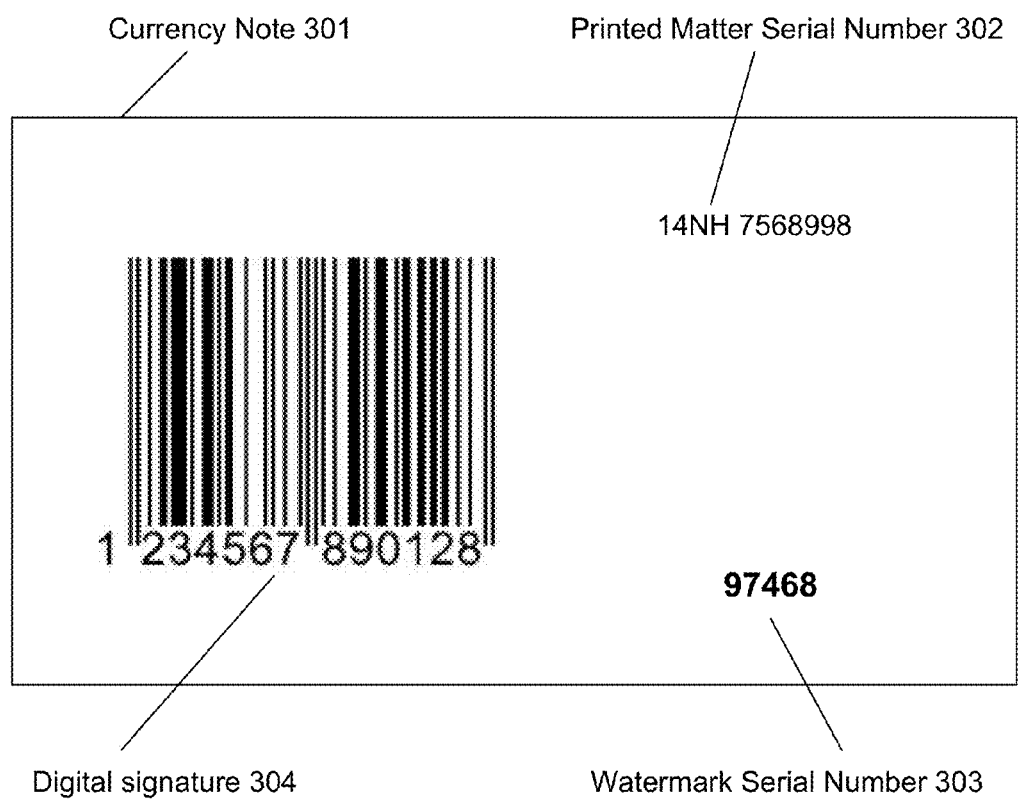
FIG. 3 illustrates an example currency note comprising the encoded authentication information according to the embodiment of the method for deterring information copying of the present invention.

For example, the financial instrument 108 may comprise a current currency note. FIG. 3 illustrates an example currency note comprising the encoded authentication information according to the embodiment of the method for deterring information copying of the present invention. The example currency note paper comprises a watermark serial number 303 of '97468' incorporated within the paper. The watermark serial number 303 uniquely identifies this particular piece of currency note paper. A printed matter serial number 302 of '14NH 7568998' is assigned to the currency note 301. Referring to both FIGS. 2 and 3, the encoding device 103 combines the watermark serial number 303 and the printed matter serial number 302 to create a combined serial number (201). The encoding device 103 creates a digital signature 304 by encoding the combined serial number using the private key 109 (202). Here, the encoding device 103 further converts the digital signature 304 into a one-dimensional bar code. The digital signature 304 may also be converted to other forms, such as two-dimensional bar codes, without departing from the spirit and scope of the present invention. The printed matter serial number 302 and the digital signature 304 are printed onto the particular piece of currency note paper by the printing device 102 (203).

Figure 4:
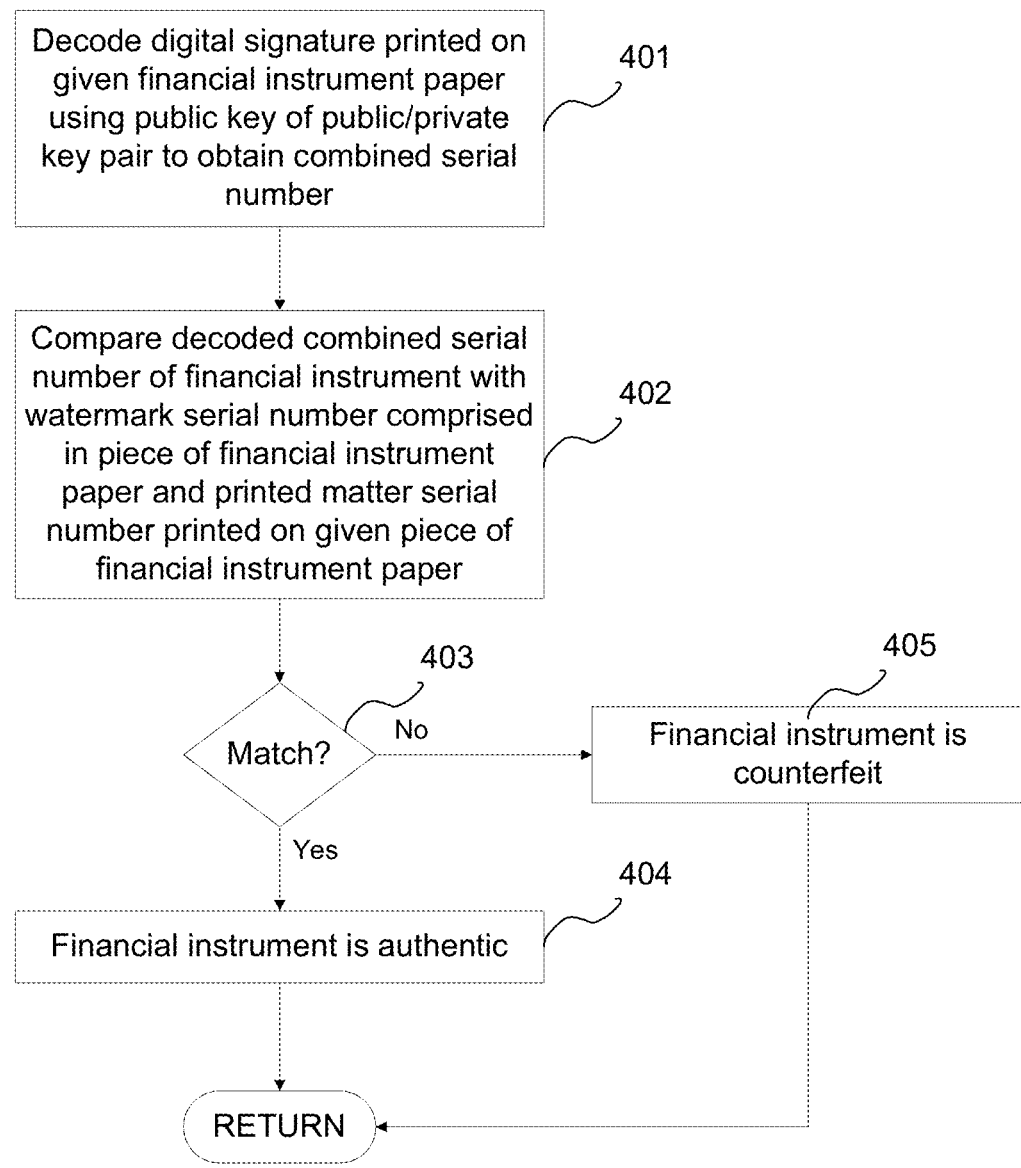
FIG. 4 is a flowchart illustrating an embodiment for decoding authentication information in a method for deterring information copying according to the present invention.

FIG. 4 is a flowchart illustrating an embodiment for decoding authentication information in a method for deterring information copying according to the present invention. To determine the authenticity of a financial instrument, the digital signature printed on the financial instrument 108 is read by the authentication device 110. The authentication device 110 decodes the digital signature using the public key 114 of the public/private key pair to obtain the unique combined serial number of the currency note 108 (401). As is known in the art, only a digital signature encoded with the matching private key 109 can be correctly decoded using the public key 114. As explained above, the combined serial number was created by combining the watermark serial number and the printed matter serial number of the currency note 108. The authentication device 110 compares the decoded combined serial number with the watermark serial number comprised in the piece of financial instrument paper and the printed matter serial number printed on the financial instrument 108 (402). In response to determining that both match (403) the decoded combined serial number, the financial instrument is determined to be authentic (404). In response to determining that either the watermark serial number or the printed matter serial number fails to match the decoded combined serial number, the financial instrument is determined to be counterfeit (405).

For example, with reference to the example currency note illustrated in FIG. 3, the authentication device 110 reads the digital signature 304 printed on the currency note 301 and decodes the digital signature 304 using the public key 114 to obtain the combined serial number (401). The authentication device 110 compares the decoded combined serial number with the watermark serial number 303 comprised in the piece of currency note paper and the printed matter serial number 302 printed on the currency note 301 (402). In response to determining that both the watermark serial number 303 and the printed matter serial number 302 match the decoded combined serial number, the currency note 301 is determined to the authentic (404). In response to determining that either the watermark serial number 303 or the printed matter serial number 302 fails to match the decoded combined serial number, the currency note 301 is determined to be counterfeit (405).

With the present invention, the currency note 301 has three unique identifiers: the watermark serial number 303, which uniquely identifies the particular piece of currency note paper; the printed matter serial number 302, which uniquely identifies the currency note 301; and the digital signature 304, which uniquely associates the watermark serial number 303 and the printed matter serial number 302 through use of the private key 109. Requiring each piece of currency note paper to comprise a unique watermark serial number increases the difficulty in reproducing the paper for counterfeiting purposes, as this requires the cooperation of the currency note paper manufacturers. Further, this requirement prevents the reproduction of a known printed matter serial number as this is insufficient to create an association with the unique watermark serial number for each currency note. Even if both a unique watermarked serial number and a unique printed matter serial number are produced, the digital signature for confirming their unique association cannot be created without access to the private key 109. Use of the private key 109 also deters introduction of new printed matter serial numbers in counterfeit currency. With an improperly introduced printed matter serial number, the digital signature for confirming its unique association with the unique watermark serial number cannot be created without access to the private key 109. Thus, using the combination of the three unique identifiers on each currency note deters the counterfeiting of paper currencies.

Although the embodiments of the present invention is described above in the context of currency notes, the present invention may also be used to deter the copying of other types of printed financial instruments without departing from the spirit and scope of the present invention. Other printed financial instruments may include, but are not limited to, bank checks, bank deposit certificates, bond certificates, bank loans, commercial papers, agreements, stamp papers, band drafts, shares certificates, demand drafts, treasury bonds, high value instruments, bills of exchange, future and option contracts, debt instruments, equity instruments, bearer bonds, bonds issued by governments, certificates of deposit, and lottery bonds. The three unique identifiers may be used with these financial instruments, as well as with other printed matter that requires uniqueness. For example, referring to FIGS. 2 and 4, in the bank check example, a piece of bank check paper is manufactured with a watermark serial number that uniquely identifies that piece of bank check paper. A check serial number is assigned to the bank check to uniquely identify the bank check. An example of a unique check serial number may include a combination of the account number, bank identifier, and check number. The encoding device 103 combines the watermark serial number of the piece of bank check paper and the check serial number to create the combined serial number (201). The encoding device 103 creates a digital signature by encoding the combined serial number using the private key 109 of the public/private key pair (202). The digital signature creates a unique association between the watermark serial number of the piece of bank check paper and the bank check serial number. The bank check serial number and the digital signature are printed on the piece of bank check paper (203).

To determine the authenticity of the bank check, the decoding device 110 reads the digital signature printed on the bank check and decodes the digital signature using the public key 114 of the public/private key pair to obtain the combined serial number (401). The decoding device 110 compares the decoded combined serial number with the watermark serial number comprised in the piece of bank check paper and the check serial number printed on the bank check (402). In response to determining that both match (403), the bank check is determined to be authentic (404). In response to determining that either the watermark serial number or the check serial number fails to match, the bank check is determined to be counterfeit (405).

Figure 5:
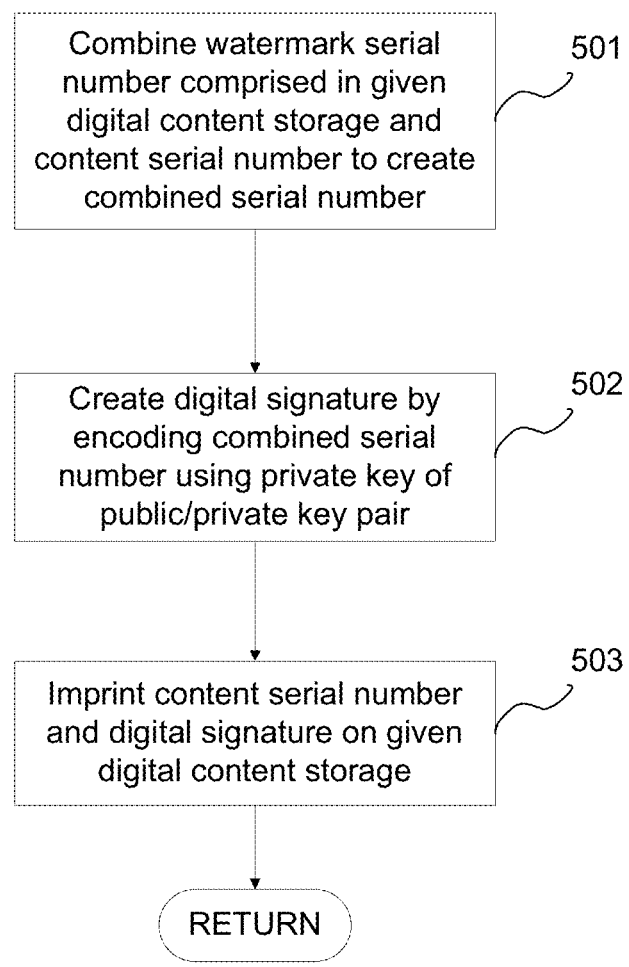
FIG. 5 is a flowchart illustrating an embodiment for encoding authentication information in a method for deterring digital content copying according to the present invention.

The present invention may also be applied to media other than paper to deter the copying of information. For example, the present invention may be used with a digital content storage for storing digital content protected by copyright, such as software, movies, music, or images. The digital content storage may include the same forms as the computer readable medium defined above. FIG. 5 is a flowchart illustrating an embodiment for encoding authentication information in a method for deterring digital content copying according to the present invention. A given digital content storage of a plurality of digital content storages comprises a watermark serial number incorporated within the given digital content storage, which uniquely identifies the given digital content storage. The digital content stored in the given digital content storage is also assigned a digital content serial number to uniquely identify the digital content. The encoding device 103 combines the watermark serial number of the given digital content storage and unique digital content serial number to create a combined serial number (501). The encoding device 103 creates a digital signature by encoding the combined serial number using the private key 109 of the public/private key pair (502). The digital content serial number and the digital signature are imprinted onto the given digital content storage by an appropriate imprinting device (503).

Figure 6:
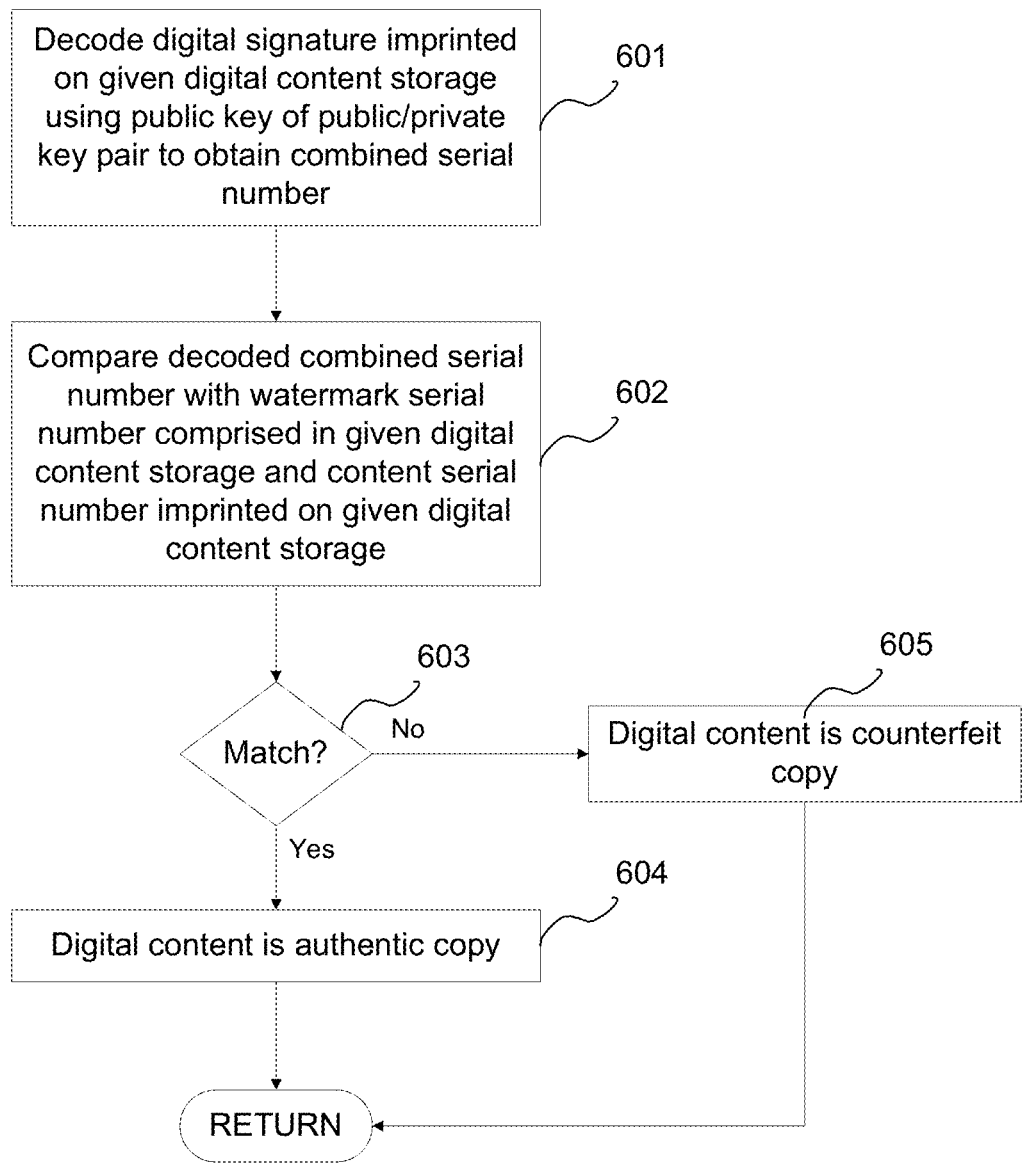
FIG. 6 is a flowchart illustrating an embodiment for decoding authentication information in a method for deterring digital content according to the present invention.

FIG. 6 is a flowchart illustrating an embodiment for decoding authentication information in a method for deterring digital content according to the present invention. To determine the authenticity of digital content stored on a digital content storage, the digital signature imprinted on the given digital content storage is read by the authentication device 110. The authentication device 110 decodes the digital signature using the public key 114 of the public/private key pair to obtain the combined serial number (601). As explained above, the combined serial number was created by combining the watermark serial number and the digital content serial number of the given digital content storage. The authentication device 110 compares the decoded combined serial number with the watermark serial number comprised in the given digital content storage and the digital content serial number imprinted on the given digital content storage (602). In response to determining that both match the decoded combined serial number (603), the digital content stored on the given digital content storage is determined to be an authentic copy (604). In response to determining that either the watermark serial number or the imprinted digital content number fails to match (603), the digital content stored on the given digital content storage is determined to be a counterfeit copy (605).

For example, assume that the computer readable medium comprises a given compact disc (CD). The CD is manufactured to comprise a watermark serial number incorporated within the CD that uniquely identifies this particular CD. A digital content serial number is assigned to the digital content stored on the given CD. The encoding device 103 combines the watermark serial number comprised in the given CD and the digital content serial number to create a combined serial number (501). The encoding device 103 creates a digital signature by encoding the combined serial number using a private key 109 of the public/private key pair (502). The digital signature and the digital content serial number are imprinted onto the given CD (503).

To determine the authenticity of the given CD, the authentication device 110 reads the digital signature imprinted on the given CD and decodes the digital signature using the public key 114 of the public/private key pair to obtain the combined serial number (601). The authentication device 110 compares the decoded combined serial number with the watermark serial number incorporated within the given CD and the digital content serial number imprinted on the given CD (602). In response to determining that both match (603), the digital content stored on the given CD is determined to be an authentic copy (604). In response to determining that either the watermark serial number incorporated within the given CD or the digital content serial number imprinted on the given CD fails to match, the digital content stored on the given CD is determined to be a counterfeit copy (605).

The descriptions of the various embodiments of the present invention has been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer program product for deterring information copying, the computer program product comprising:
   a computer readable storage medium having computer readable program code embodied therewith, the computer readable program code configured to:
   mark onto each security instrument medium of a plurality of security instrument media a unique matter serial number, wherein each security instrument medium is associated with a unique watermark serial number incorporated within the security instrument medium as a watermark, wherein each unique watermark serial number uniquely identifies the security instrument medium within which the unique watermark serial number is incorporated, wherein each unique matter serial number uniquely identifies a security instrument created from the security instrument medium onto which the unique matter serial number is marked;
   for a given security instrument, combine the unique watermark serial number incorporated within the security instrument medium of the given security instrument and the unique matter serial number marked onto the security instrument medium of the given security instrument to create a unique combined serial number;
   create a digital signature by encoding the unique combined serial number using a private key of a public/private key pair; and
   imprint the digital signature on the security instrument medium of the given security instrument.

2. The computer program product of claim 1, wherein the computer readable program code configured to mark the digital signature onto the security instrument of the given security instrument is further configured to:
   convert the digital signature to a bar code; and
   imprint the bar code onto the security instrument medium of the given security instrument.

3. The computer program product of claim 1, wherein the computer readable program code is further configured to:
   decode the digital signature marked onto the security instrument medium of the given security instrument using a public key of the public/private key pair to obtain the combined serial number;
   compare the decoded combined serial number with the unique watermark serial number incorporated within the security instrument medium of the given security instrument and the unique matter serial number marked onto the security instrument medium of the given security instrument; and
   in response to determining that the unique watermark serial number incorporated within the security instrument medium of the security instrument and the unique matter serial number marked onto the security instrument medium of the given security instrument match the decoded combined serial number, determine that the security instrument is authentic.

4. The computer program product of claim 3, wherein the computer readable program code is further configured to:
   in response to determining that the unique watermark serial number incorporated within the security instrument medium of the given security instrument or the unique matter serial number marked onto the security instrument medium of the given security instrument fails to match the decoded combined serial number, determine that the security instrument is counterfeit.

\* \* \* \* \*